(12) United States Patent
Kastrup et al.

(10) Patent No.: US 8,061,142 B2
(45) Date of Patent: Nov. 22, 2011

(54) MIXER FOR A COMBUSTOR

(75) Inventors: David Allen Kastrup, West Chester, OH (US); Marie Ann McMasters, Mason, OH (US)

(73) Assignee: General Electric Company, Schecentady, NY (US)

( * ) Notice: Subject to any disclaimer, the term of this patent is extended or adjusted under 35 U.S.C. 154(b) by 766 days.

(21) Appl. No.: 12/120,785

(22) Filed: May 15, 2008

(65) Prior Publication Data

US 2009/0255259 A1  Oct. 15, 2009

(51) Int. Cl.
*F02C 1/00* (2006.01)
*F02G 3/00* (2006.01)

(52) U.S. Cl. .......................... 60/748; 239/399

(58) Field of Classification Search ............ 60/748; 239/399; 415/208.2
See application file for complete search history.

(56) References Cited

U.S. PATENT DOCUMENTS

| | | | |
|---|---|---|---|
| 5,057,073 A | 10/1991 | Martin | |
| 5,824,250 A | 10/1998 | Whalen et al. | |
| 6,391,251 B1 | 5/2002 | Keicher et al. | |
| 6,634,175 B1 | 10/2003 | Kawata et al. | |
| 6,676,892 B2 | 1/2004 | Das et al. | |
| 6,718,770 B2 | 4/2004 | Laing et al. | |
| 6,796,770 B2 | 9/2004 | Gigas et al. | |
| 6,811,744 B2 | 11/2004 | Keicher et al. | |
| 6,839,607 B2 | 1/2005 | Wooten | |
| 6,951,227 B1 | 10/2005 | Su et al. | |
| 6,976,363 B2 | 12/2005 | McMasters et al. | |
| 7,056,095 B1 | 6/2006 | Gigas et al. | |
| 7,062,920 B2 | 6/2006 | McMasters et al. | |
| 7,065,972 B2 * | 6/2006 | Zupanc et al. | 60/748 |
| 7,121,095 B2 | 10/2006 | McMasters et al. | |
| 7,415,826 B2 | 8/2008 | McMasters et al. | |
| 7,464,553 B2 | 12/2008 | Hsieh et al. | |
| 7,531,123 B2 | 5/2009 | Dietrich et al. | |
| 7,565,803 B2 | 7/2009 | Li et al. | |
| 7,581,396 B2 | 9/2009 | Hsieh et al. | |
| 7,762,073 B2 | 7/2010 | Li et al. | |
| 7,788,927 B2 | 9/2010 | McMasters et al. | |
| 7,841,368 B2 | 11/2010 | McMasters et al. | |
| 2005/0265828 A1 * | 12/2005 | Horng et al. | 415/187 |
| 2007/0017224 A1 | 1/2007 | Li et al. | |
| 2007/0028595 A1 | 2/2007 | Mongia et al. | |
| 2007/0028617 A1 | 2/2007 | Hsieh et al. | |
| 2007/0028618 A1 | 2/2007 | Hsiao et al. | |
| 2007/0028620 A1 | 2/2007 | McMasters et al. | |
| 2007/0028624 A1 | 2/2007 | Hsieh et al. | |

(Continued)

OTHER PUBLICATIONS

U.S. Appl. No. 11/365,428, filed Mar. 1, 2006.

*Primary Examiner* — Ted Kim
*Assistant Examiner* — Nicholas Karnezos
(74) *Attorney, Agent, or Firm* — David J. Clement, Esq.; Trego, Hines & Ladenheim, PLLC

(57) ABSTRACT

A mixer having a unitary construction is disclosed comprising an annular housing having an axis and at least a first swirler having a plurality of vanes arranged circumferentially around the axis such that circumferentially adjacent vanes form at least one flow passage that is oriented at least partially in an axial direction with respect to the axis. In another exemplary embodiment, a mixer having a unitary construction is disclosed comprising a swirler having a plurality of radial vanes arranged circumferentially around the axis and oriented at least partially in a radial direction.

8 Claims, 16 Drawing Sheets

U.S. PATENT DOCUMENTS

| | | |
|---|---|---|
| 2007/0071902 A1 | 3/2007 | Dietrich et al. |
| 2007/0084047 A1 | 4/2007 | Lange et al. |
| 2007/0098929 A1 | 5/2007 | Dietrich et al. |
| 2007/0163114 A1 | 7/2007 | Johnson |
| 2009/0255102 A1 | 10/2009 | McMasters et al. |
| 2009/0255116 A1 | 10/2009 | McMasters et al. |
| 2009/0255118 A1 | 10/2009 | Kastrup et al. |
| 2009/0255119 A1 | 10/2009 | McMasters et al. |
| 2009/0255120 A1 | 10/2009 | McMasters et al. |
| 2009/0255256 A1 | 10/2009 | McMasters et al. |
| 2009/0255257 A1 | 10/2009 | McMasters et al. |
| 2009/0255260 A1 | 10/2009 | McMasters et al. |
| 2009/0255261 A1 | 10/2009 | McMasters et al. |
| 2009/0255262 A1 | 10/2009 | McMasters et al. |
| 2009/0255264 A1 | 10/2009 | McMasters et al. |
| 2009/0255265 A1 | 10/2009 | McMasters et al. |
| 2009/0256003 A1 | 10/2009 | McMasters et al. |
| 2009/0256007 A1 | 10/2009 | McMasters et al. |
| 2010/0065142 A1 | 3/2010 | McMasters et al. |

\* cited by examiner

MIXER FOR A COMBUSTOR

CROSS-REFERENCE TO RELATED APPLICATIONS

This Application claims priority to U.S. Provisional Application Ser. No. 61/044,116, filed Apr. 11, 2008, which is herein incorporated by reference in its entirety.

BACKGROUND OF THE INVENTION

This invention relates generally to combustors, and more specifically to mixers used for enhancing fuel/air mixing in gas turbine engine combustors.

Modern day emphasis on minimizing the production and discharge of gases that contribute to smog and to other undesirable environmental conditions, particularly those gases that are emitted from gas turbine engines, have led to different combustor designs that have been developed in an effort to reduce the production and discharge of such undesirable combustion product components. Other factors that influence combustor design are the desires of users of gas turbine engines for efficient, low cost operation, which translates into a need for reduced fuel consumption while at the same time maintaining or even increasing engine output. As a consequence, important design criteria for aircraft gas turbine engine combustion systems include provision for high combustion temperatures, in order to provide high thermal efficiency under a variety of engine operating conditions, as well as the minimization of undesirable combustion conditions that contribute to the emission of particulates, and to the emission of undesirable gases, and to the emission of combustion products that are precursors to the formation of photochemical smog.

Various governmental regulatory bodies have established emission limits for acceptable levels of unburned hydrocarbons (HC), carbon monoxide (CO), and oxides of nitrogen (NOx), which have been identified as the primary contributors to the generation of undesirable atmospheric conditions. Therefore, different combustor designs have been developed to meet those criteria. For example, one way in which the problem of minimizing the emission of undesirable gas turbine engine combustion products has been attacked is the provision of staged combustion. In that arrangement, a combustor is provided in which a first stage burner is utilized for low speed and low power conditions to more closely control the character of the combustion products. A combination of first stage and second stage burners is provided for higher power outlet conditions while attempting to maintain the combustion products within the emissions limits. It will be appreciated that balancing the operation of the first and second stage burners to allow efficient thermal operation of the engine, while simultaneously minimizing the production of undesirable combustion products, is difficult to achieve. In that regard, operating at low combustion temperatures to lower the emissions of NOx, can also result in incomplete or partially incomplete combustion, which can lead to the production of excessive amounts of HC and CO, in addition to producing lower power output and lower thermal efficiency. High combustion temperature, on the other hand, although improving thermal efficiency and lowering the amount of HC and CO, often results in a higher output of NOx. In the art, one of the ways in which production of undesirable combustion product components in gas turbine engine combustors is minimized over the engine operating regime is by using a staged combustion system using primary and secondary fuel injection ports.

Another way that has been proposed to minimize the production of those undesirable combustion product components is to provide for more effective intermixing of the injected fuel and the combustion air. In that regard, numerous mixer designs have been proposed over the years to improve the mixing of the fuel and air. In this way, burning occurs uniformly over the entire mixture and reduces the level of HC and CO that result from incomplete combustion.

One mixer design that has been utilized is known as a twin annular premixing swirler (TAPS), which is disclosed in the following U.S. Pat. Nos.: 6,354,072; 6,363,726; 6,367,262; 6,381,964; 6,389,815; 6,418,726; 6,453,660; 6,484,489; and, 6,865,889. It will be understood that the TAPS mixer assembly includes a pilot mixer which is supplied with fuel during the entire engine operating cycle and a main mixer which is supplied with fuel only during increased power conditions of the engine operating cycle. Improvements in the main mixer of the assembly during high power conditions (i.e., take-off and climb) are disclosed in patent applications having Ser. Nos. 11/188,596, 11/188,598, and 11/188,470.

The mixers have swirler assemblies that swirl the air passing through them to promote mixing of air with fuel prior to combustion. The swirler assemblies used in the combustors are complex structures having axial, radial or conical swirlers or a combination of them. In the past, conventional manufacturing methods have been used to fabricate mixers having swirler components that are assembled or joined together using known methods to form the swirler assemblies. For example, in some mixers with complex vanes, individual vanes are first machined and then brazed into an assembly. Investment casting methods have been used in the past in producing some combustor swirlers. Other swirlers have been machined from raw stock. Electro-discharge machining (EDM) has been used as a means of machining the vanes in the swirlers.

Conventional combustor components such as, for example, mixers, are generally expensive to fabricate and/or repair because the conventional mixer designs include a complex assembly and joining of several components. More specifically, the use of braze joints can increase the time needed to fabricate such mixers and can also complicate the fabrication process for any of several reasons, including: the need for an adequate region to allow for braze alloy placement; the need for minimizing unwanted braze alloy flow; the need for an acceptable inspection technique to verify braze quality; and, the necessity of having several braze alloys available in order to prevent the re-melting of previous braze joints. Moreover, numerous braze joints may result in several braze runs, which may weaken the parent material of the component. The presence of numerous braze joints can undesirably increase the weight and manufacturing cost of the mixer assemblies.

Complexities of the swirler geometries and the associated difficulties in the machining and normal wear of the tools such as the EDM electrodes during the machining process, cause significant manufacturing variability in the mixer assemblies. Such manufacturing variability in the mixer assemblies may lead to undesirable aerodynamic flow variability in the mixers and adversely impact the aerodynamic performance of the combustor.

Thus, there is a need to provide a gas turbine engine combustor mixer using a manufacturing method with reduced variability. Further, it is desirable to have mixers with complex geometries and swirler arrangements having a unitary construction to reduce dimensional variations from manufacturing to improve operability and reduce emissions over the engine's operating envelope and to reduce costs. It is desirable to have a method of manufacturing a mixer having complex three dimensional geometries in a unitary construction.

BRIEF DESCRIPTION OF THE INVENTION

The above-mentioned need or needs may be met by exemplary embodiments which provide a mixer having a unitary construction comprising an annular housing having an axis and at least a first swirler having a plurality of vanes arranged circumferentially around the axis such that circumferentially adjacent vanes form at least one flow passage that is oriented at least partially in an axial direction with respect to the axis.

In another exemplary embodiment, a mixer having a unitary construction is disclosed comprising an annular housing having an axis and a swirler having a plurality of radial vanes arranged circumferentially around the axis such that circumferentially adjacent vanes form at least one flow passage that is oriented at least partially in a radial direction.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
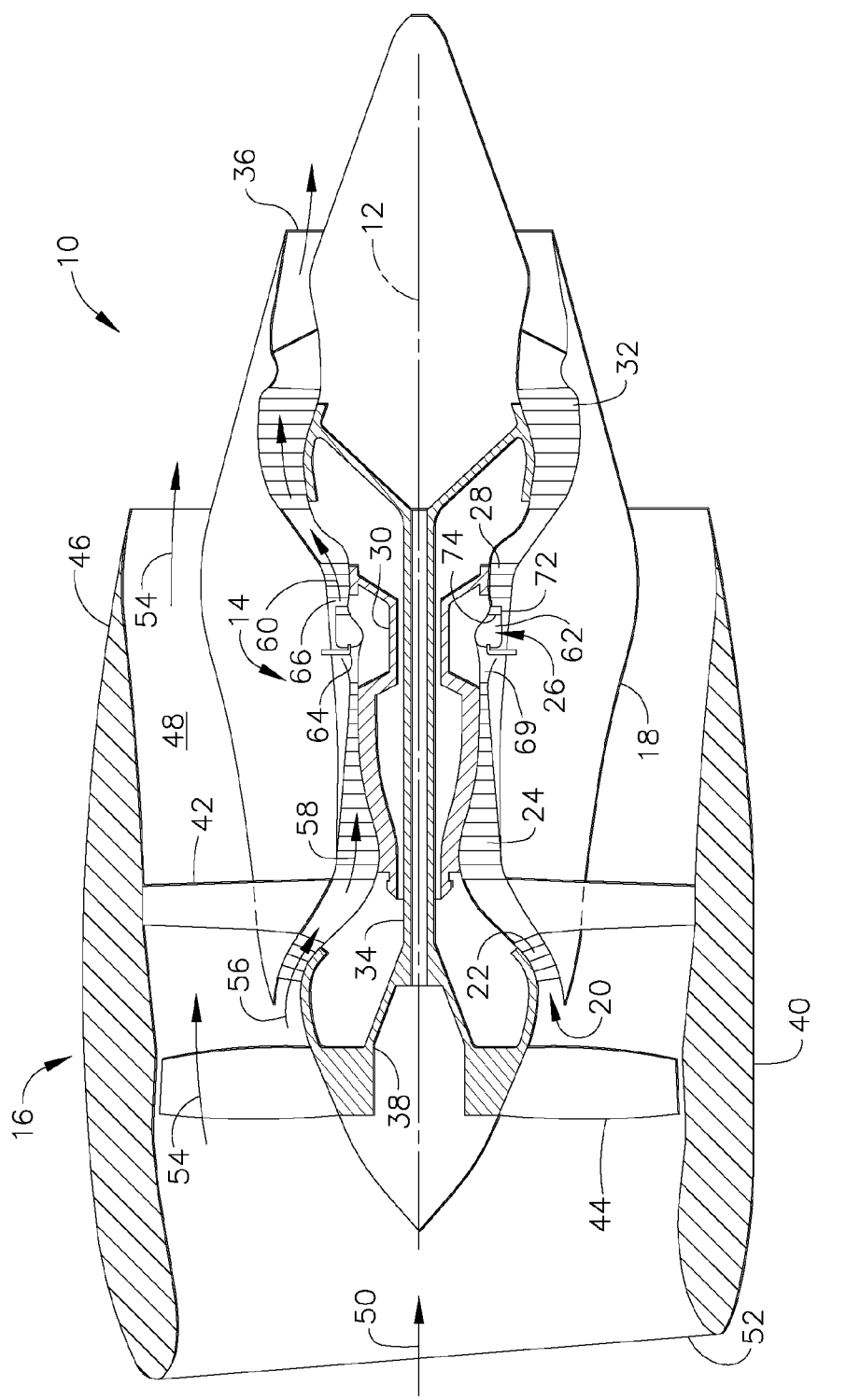
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream and ignited to raise the temperature and energy level of the pressurized air. The high energy combustion products flow from combustor 26 to a first (high pressure) turbine 28 for driving the high pressure compressor 24 through a first (high pressure) drive shaft 30, and then to a second (low pressure) turbine 32 for driving booster 22 and fan section 16 through a second (low pressure) drive shaft 34 that is coaxial with first drive shaft 30. After driving each of turbines 28 and 32, the combustion products leave core engine 14 through an exhaust nozzle 36 to provide at least a portion of the jet propulsive thrust of the engine 10.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional jet propulsive thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster 22.

The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide at least a portion of the thrust for gas turbine engine 10.

The combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixer 100, such as, for example, shown in FIG. 2. In the exemplary embodiment shown in FIG. 2, air enters into the mixer 100 in a radial-circumferential direction (as represented by arrows 102, 104) and in an axial direction (as represented by arrow 106). Fuel is injected from a fuel nozzle tip assembly 68 to mix with the air and form a fuel-air mixture that is provided to combustion chamber 62 for combustion. Ignition of the fuel-air mixture is accomplished by a suitable igniter, and the resulting combustion gases 60 flow in an axial direction toward and into an annular, first stage turbine nozzle 72. Nozzle 72 is defined by an annular flow channel that includes a plurality of radially-extending, circumferentially-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster 24 and fan rotor 38 via second drive shaft 34.

Combustion chamber 62 is housed within engine outer casing 18. Fuel is supplied into the combustion chamber by a fuel nozzle assembly 80, shown in FIG. 2. Fuel is supplied through fuel supply conduits located within a stem 82 to a fuel nozzle tip assembly 68. The mixer 100 circumferentially surrounds the fuel nozzle tip assembly 68. Primary (pilot) and secondary fuel is sprayed by the fuel nozzle tip assembly 68, using conventional means.

Figure 2:
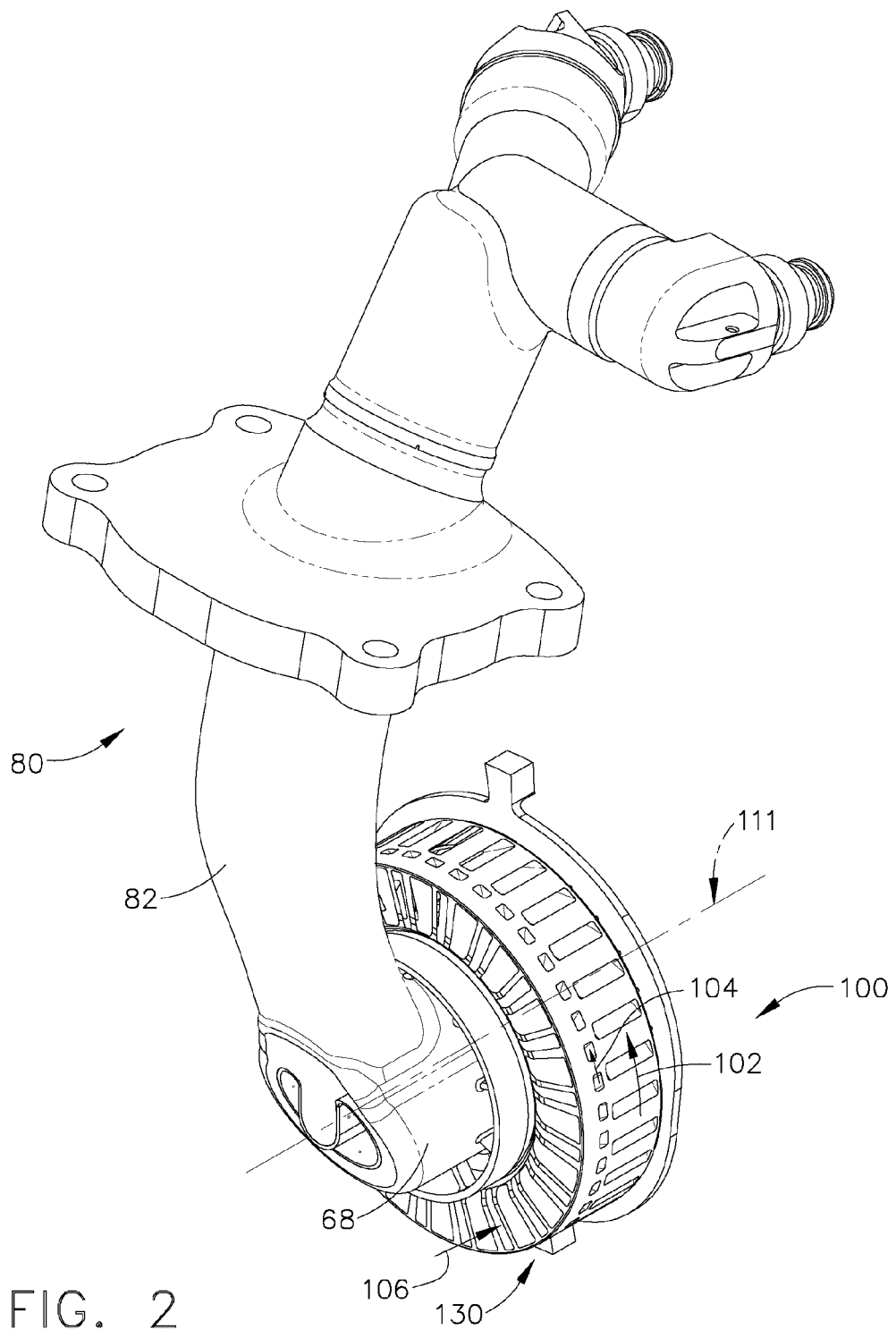
FIG. 2 is a partial isometric view of a unitary mixer according to an exemplary embodiment of the present invention located on a fuel nozzle assembly.

FIG. 2 shows an isometric view of the exemplary embodiment of the mixer 100 having a unitary construction shown in FIG. 1. The term "unitary" is used in this application to denote that the associated component, such as the mixer 100 200, 300 described herein, is made as a single piece during manufacturing. Thus, a unitary component has a monolithic construction for the entire component, and is different from a component that has been made from a plurality of component pieces that have been joined together to form a single component. The unitary mixer 100 includes an annular main housing 120 (see FIG. 3) that radially surrounds the fuel nozzle tip assembly 68 (see FIG. 1) and defining an annular cavity between the housing 120 and the fuel nozzle tip assembly 68. A plurality of fuel injection ports (not shown) introduce fuel into annular cavity between the housing 120 and the fuel nozzle tip assembly 68. The exemplary embodiment of the mixer 100 shown FIG. 2 comprises a swirler arrangement identified generally by numeral 130.

Figure 3:
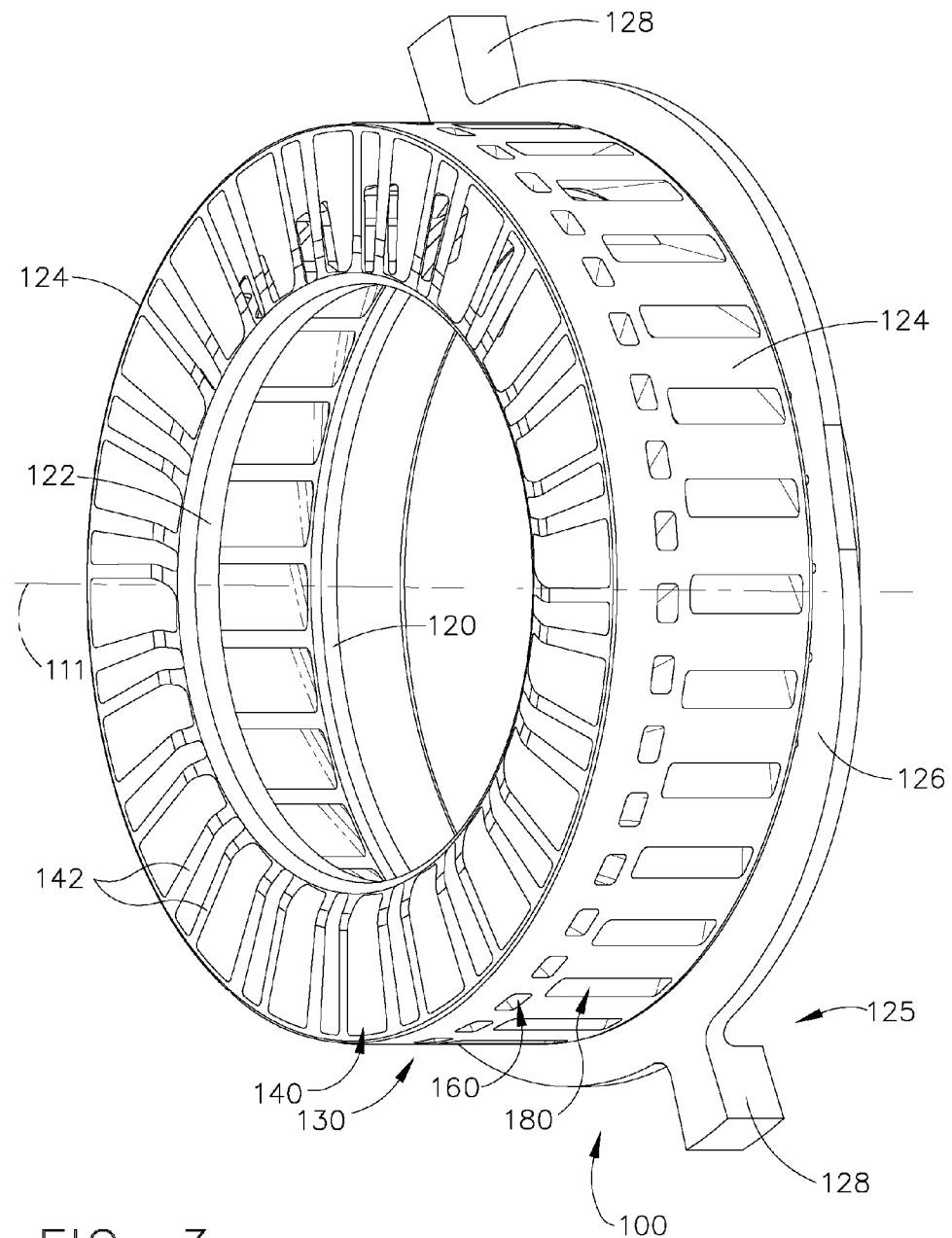
FIG. 3 is an isometric view of a unitary mixer according to an exemplary embodiment of the present invention.
Figure 8:
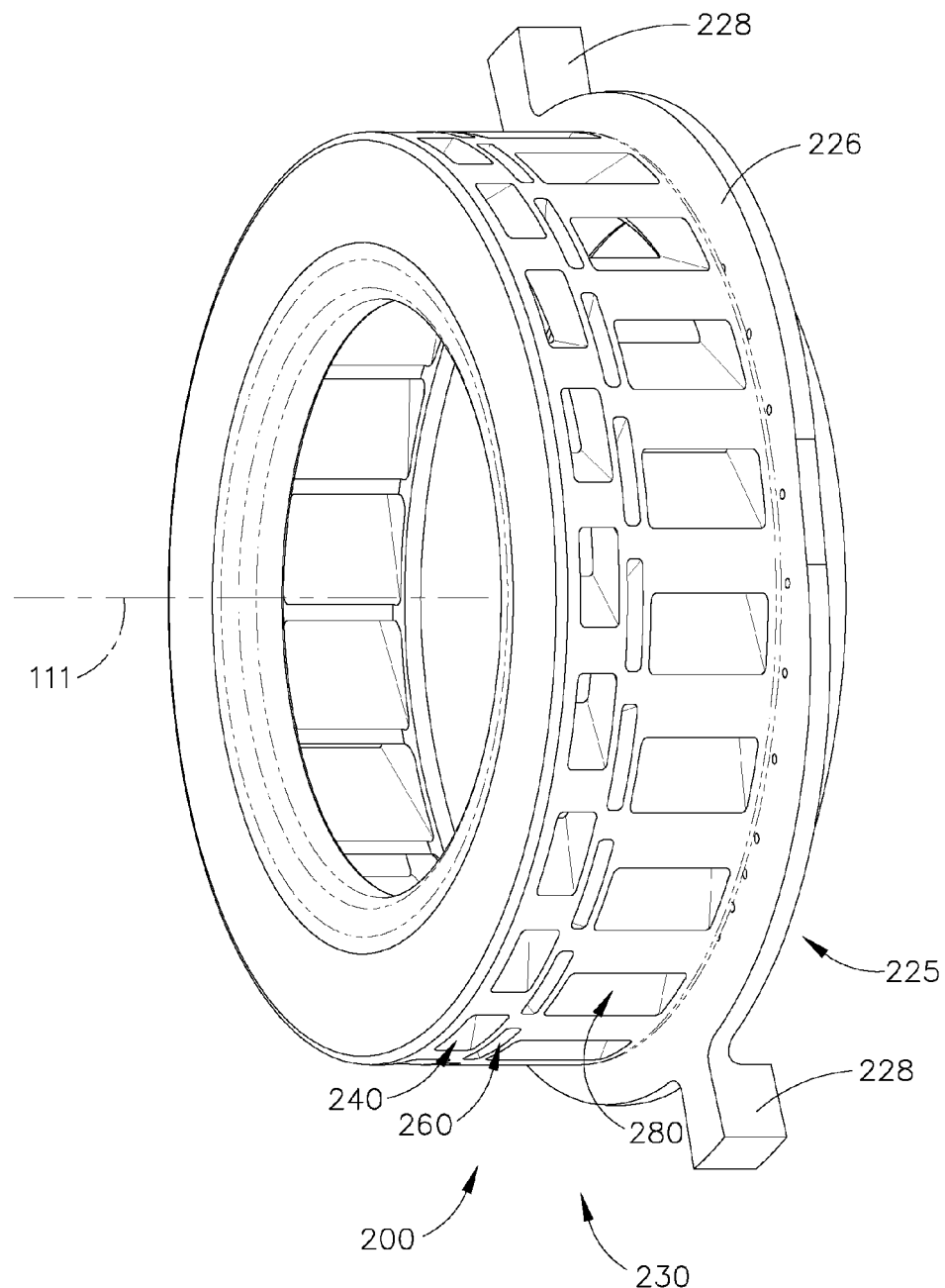
FIG. 8 is an isometric view of a unitary mixer according to an alternate exemplary embodiment of the present invention.
Figure 13:
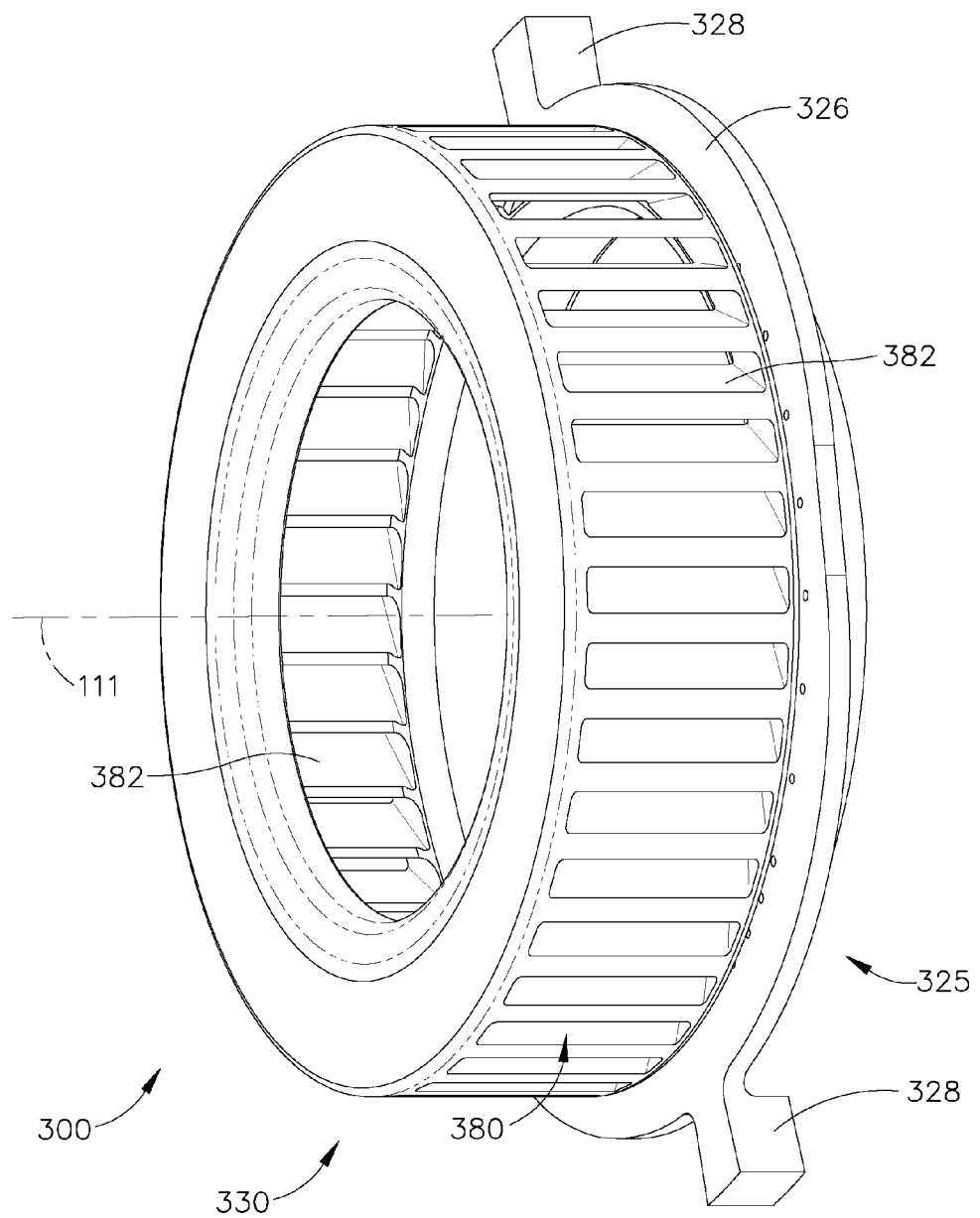
FIG. 13 is an isometric view of a unitary mixer according to an alternate exemplary embodiment of the present invention.

Swirler arrangement 130 may be configured in any of several ways, such as, for example, shown in exemplary embodiments of unitary mixers 100, 200, 300 shown herein in FIG. 3, FIG. 8 and FIG. 13 respectively. A patent application entitled "Mixer Assembly For Combustor Of A Gas Turbine Engine Having A Plurality Of Counter-Rotating Swirlers" having Ser. No. 11/188,596 and a patent application entitled "Swirler Arrangement For Mixer Assembly Of A Gas Turbine Engine Combustor Having Shaped Passages" having Ser. No. 11/188,595, both of which are assigned to the owner of the present invention show exemplary swirler arrangements.

As shown in FIGS. 3-7, the unitary mixer 100 (i.e., mixer 100 having a unitary construction) comprises a swirler arrangement 130 having at least one swirler, such as, for example, numeral item 140 shown in FIG. 3. In a preferred embodiment of the mixer shown in FIGS. 3-7, unitary mixer 100 comprises a swirler arrangement 130 having three swirlers 140, 160, 180, located in a housing 120. The unitary mixer 100 has an annular construction around an axis 111 having a radially inner hub 122, a rim 124 located radially outwardly from the hub 122. The unitary mixer 100 has a mount system 125 comprising an annular flange 126 that is located at one end of the mixer. The flange is used to locate the unitary mixer 100 within the annular combustor 26. At least one pair of tabs 128 may be located on the flange 126. The tabs 128 are used to orient and locate mixer 100 circumferentially in the combustor 26 and facilitates to react the mechanical and aerodynamic loads and moments induced in the mixer 100. Assembling of mixers circumferentially around annular combustors has been described in the following U.S. Pat. Nos.: 7,062,920; 7,121,095; and 6,976,363, and the U.S. Patent Application publication US 2007/0028620A1.

Figure 4:
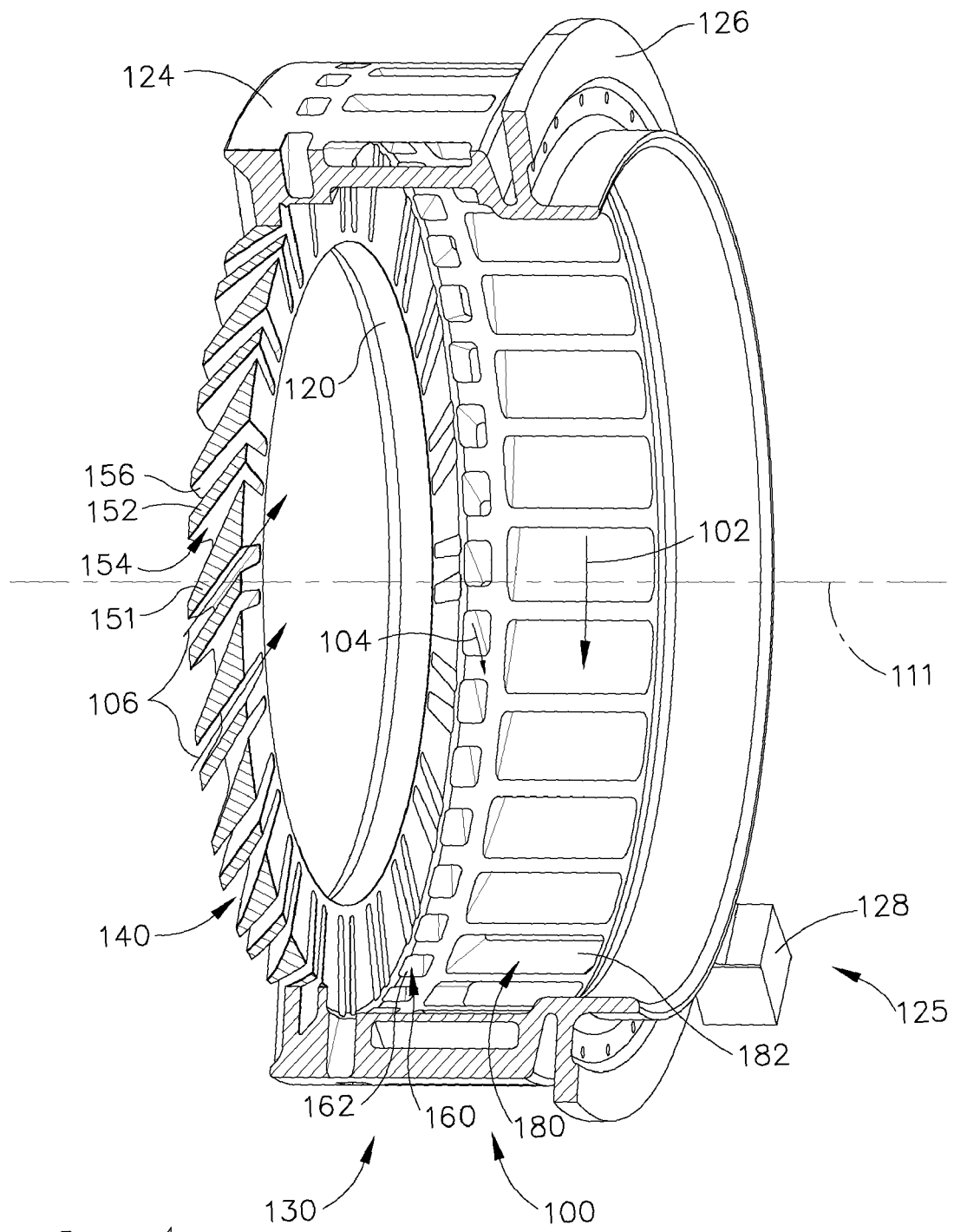
FIG. 4 is an isometric cross sectional view of a unitary mixer according to the exemplary embodiment of the present invention shown in FIG. 3.
Figure 5:
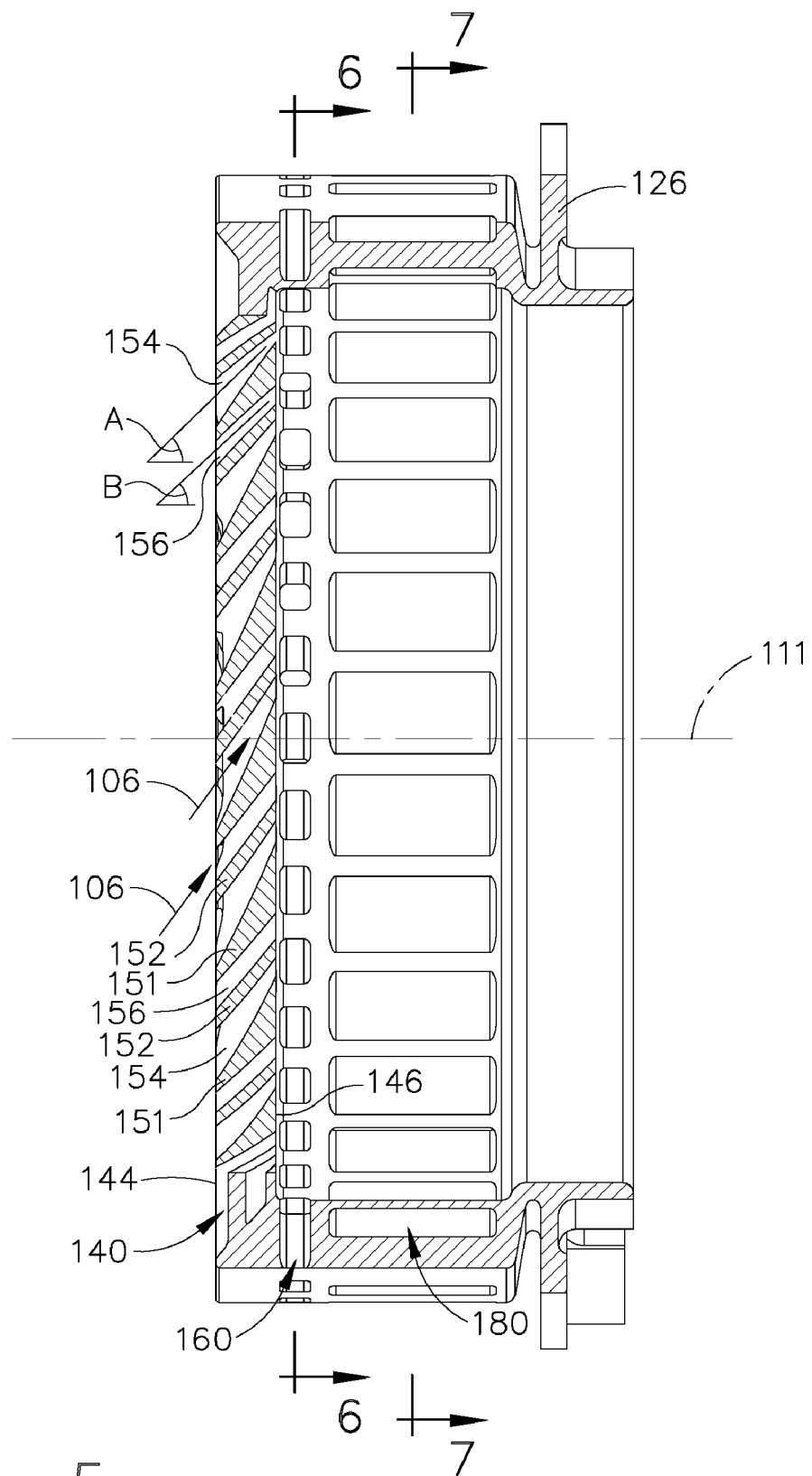
FIG. 5 is a side cross sectional view of the exemplary embodiment of the present invention of a unitary mixer shown in FIG. 3.

In the exemplary embodiment of the unitary mixer 100 shown in FIGS. 3-7, the first swirler 140 comprises a plurality of axial vanes 142 that are arranged circumferentially around the mixer axis 111. The axial vanes 142 extend in the radial direction from the hub 122 to the rim 124. The axial vanes 142 extend generally in the axial direction with respect to the axis 111 from a first location 144 (entrance location) to a second location 146 (exit location). As seen in FIG. 5, the axial vanes 142 are arranged circumferentially around the mixer axis 111 such that circumferentially adjacent vanes 151, 152 form passages 154, 156 between them, through which air flows into the mixer 100, as represented by air flow direction arrows 106.

Although it is possible to have the same geometry and orientation for all the axial vanes 142 in the swirler 140, it is not necessary to do so. In the preferred embodiment shown in FIG. 5, the swirler 140 comprises circumferentially adjacent axial vanes 151 and 152 that have different thickness variations in the axial direction such that a first flow passage 154 and a second flow passage 156 are formed on each side of the axial vanes 151 and 152. The first flow passage 154 has an orientation angle "A" and the second flow passage 156 has a second orientation angle "B" with respect to the mixer axis 111. The variation of the flow area in the axial direction for each of the flow passages 154 and 156 can be suitably designed by varying the thickness distribution of the adjacent vanes 151 and 152 In a preferred embodiment of the mixer, the thickness distribution for the axial vanes 151 and 152 are such that the adjacent flow passages 154 and 156 have an alternating converging-diverging characteristic: i.e., flow passage 154 has a progressively smaller flow area ("converging") in the axial direction and flow passage 156 has a progressively larger area ("diverging") in the axial direction. Flow passage 148 shown in FIG. 5 is also converging in the axial direction. It is known that subsonic air flowing through a converging flow path is accelerated whereas subsonic air flowing through a diverging flow path is decelerated. Alternatively varying the flow passage areas between adjacent flow passages 154, 156 facilitates intense mixing of the air and fuel inside the mixer 100. It is also possible to have other suitable geometric variations in the adjacent flow passages 154, 156, such as for example, a converging flow passage on one side of an axial vane 154, 152 and a constant flow passage on the other side of the axial vane 154, 152. It is also possible to have different orientation angles "A" and "B" with respect to the axis 111 for two adjacent flow passages 151 and 152 The exemplary embodiment shown in FIGS. 3-7 comprises a swirler 140 having about 36 to 50 axial vanes 142 arranged in the circumferential direction, having two orientation angles "A" and "B". In the exemplary embodiment shown in FIG. 5, the orientation angles "A" and "B" preferably have values of approximately 65 degrees and 50 degrees respectively, and the flow passage 154 converges about 80% in the axial direction and the flow passage 156 diverges about 50% in the axial direction.

Figure 6:
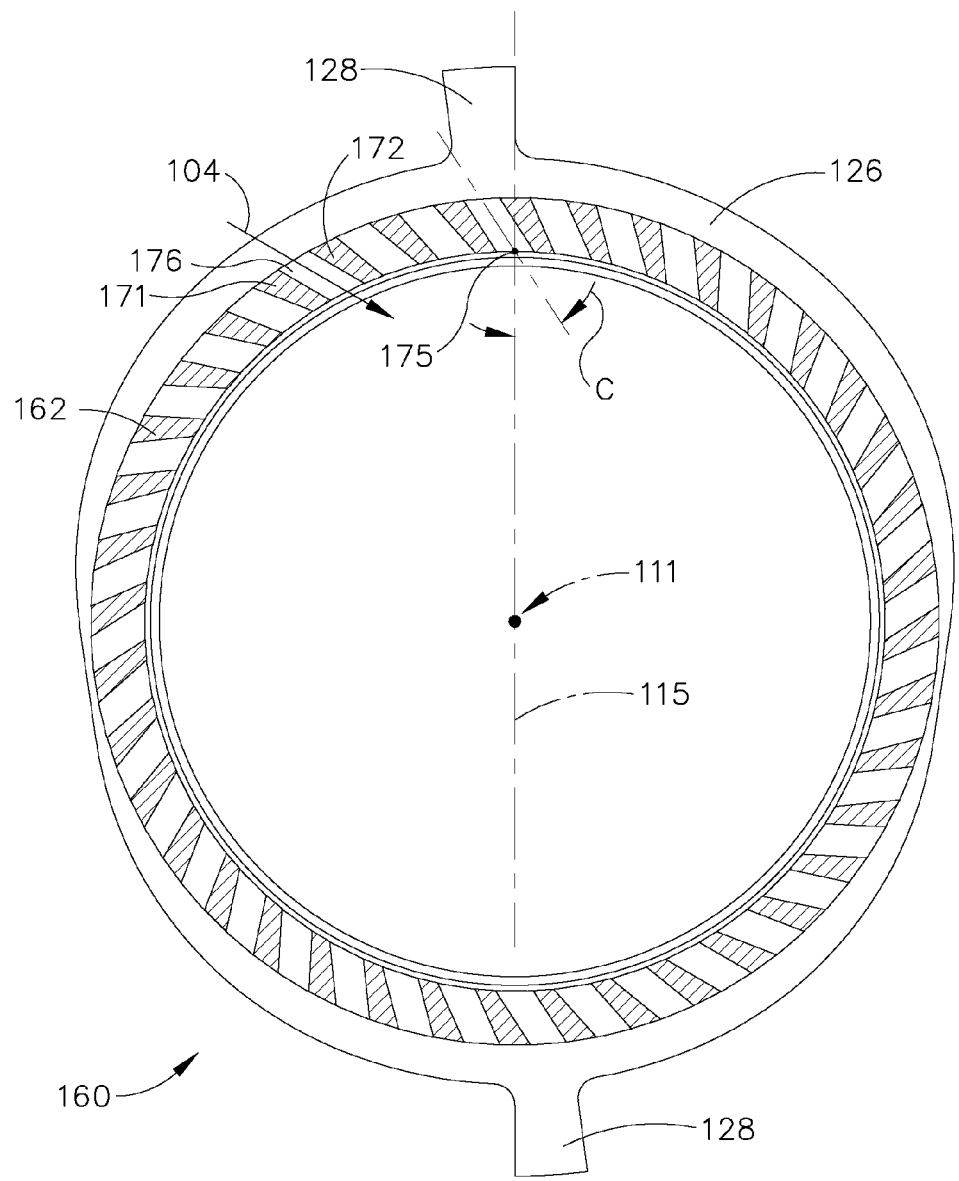
FIG. 6 is a frontal cross sectional view of the exemplary embodiment of the present invention shown in FIG. 3.

The exemplary embodiment of a unitary mixer 100 shown in FIGS. 3-7 comprises a second swirler 160 that is located axially aft from the first swirler 140. A cross sectional view of the second swirler 160 perpendicular to the mixer axis 111 is shown in FIG. 6. It will be noted that second swirler 160 includes a plurality of radial vanes 162 for swirling the air flowing therebetween. As shown, the second swirler 160 having radial vanes 162 is preferably oriented substantially radially to centerline axis 111 through mixer 100. Air flows into the mixer 100 through flow passages 176 between adjacent radial vanes 171, 172 in a substantially radially inward direction, as shown by air flow arrow 104. In the exemplary embodiment shown in FIG. 6, radial vanes 162 are substantially uniformly spaced circumferentially and a plurality of substantially uniform passages 176 are defined between adjacent radial vanes such as, for example, items 171, 172 in FIG. 6. Although radial vanes 162 are shown as being substantially uniformly spaced circumferentially, thereby defining a plurality of substantially uniform passages therebetween, it will further be understood that swirler 160 may include radial vanes 162 having different configurations so as to shape the passages 176 in a desirable manner, such as, for example, as disclosed in the '595 patent application identified hereinabove. In the exemplary embodiment shown in FIG. 6, the second swirler 160 has about 36 to 50 radial vanes 162. Radial vanes 162 are oriented such that the flow passage formed between two adjacent radial vanes 171, 172 has an orientation angle "C" with respect to a line 115 perpendicular to the mixer axis 111 and passing through the center 175 of the passage where air flow 104 enters the mixer 100. In the exemplary embodiment shown in FIG. 6, the orientation angle "C" is preferably between about 30-70 degrees.

Figure 7:
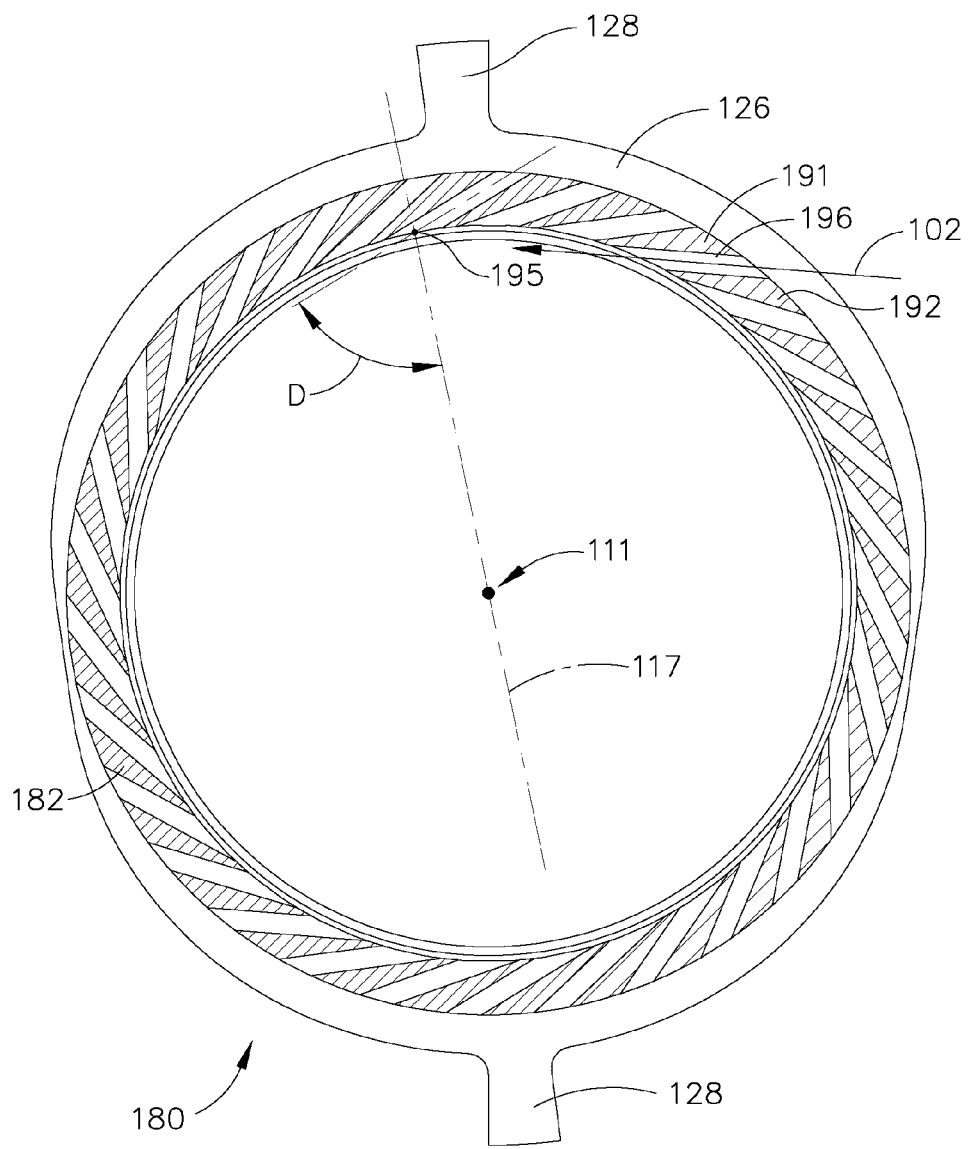
FIG. 7 is a frontal cross sectional view of the exemplary embodiment of the present invention shown in FIG. 3.

The exemplary embodiment of a unitary mixer 100 shown in FIGS. 3-7 comprises a third swirler 180 that is located axially aft from the second swirler 160. A cross sectional view of the second swirler 180 perpendicular to the mixer axis 111 is shown in FIG. 7. It will be noted that third swirler 180 includes a plurality of radial vanes 182 for swirling the air flowing therebetween. As shown, the third swirler 180 having radial vanes 182 is preferably oriented generally in the radial-tangential direction with respect to centerline axis 111 through mixer 100. Air flows into the mixer 100 through flow passages 196 between adjacent radial vanes 191, 192 in a generally radially inward direction having a substantial tangential orientation, as shown by air flow arrow 102. In the exemplary embodiment shown in FIG. 7, radial vanes 182 are substantially uniformly spaced circumferentially and a plurality of substantially uniform passages 196 are defined between adjacent radial vanes such as, for example, items 191, 192 in FIG. 7. Although radial vanes 182 are shown as being substantially uniformly spaced circumferentially, thereby defining a plurality of substantially uniform passages therebetween, it will further be understood that swirler 180 may include radial vanes 182 having different configurations so as to shape the passages 196 in a desirable manner. In the exemplary embodiment shown in FIG. 7, the third swirler 180 has about 30 to 50 radial vanes 182. Radial vanes 182 are oriented such that the flow passage formed between two adjacent radial vanes 191, 192 has an orientation angle "D" with respect to a line 117 perpendicular to the mixer axis 111 and passing through the center 195 of the passage where air flow 102 enters the mixer 100. In the exemplary embodiment shown in FIG. 7, the orientation angle "D" is preferably between about 0-60 degrees.

It will be understood that air flowing through second swirler 160 will be swirled in a first direction and air flowing through third swirler 180 will preferably be swirled in a direction opposite the first direction. This is accomplished by appropriately choosing the orientation angles "C" and "D" for the air flow passages 176 and 196 respectively. In this way, an intense mixing of air and fuel is accomplished within combustor having an enhanced total kinetic energy. By properly configuring swirlers 140, 160 and 180, an intense mixing region can be substantially centered within annular cavity around the fuel nozzle tip assembly 68. The configuration of the vanes in swirlers 140, 160 and 180 may be altered to vary the swirl direction of air flowing therethrough and not be limited to the exemplary swirl directions indicated hereinabove.

It will be seen in FIGS. 3-5 that, with respect to the mixer axis 111, the axial length of radial vanes 182 of the third swirler 180 is preferably greater than the axial length of radial vanes 162 of the second swirler 160. Accordingly, a relatively greater amount of air flows through third swirler 180 than through second swirler 160 due to the greater passage area therefore. The relative axial lengths of swirlers 180 and 160 may be varied as desired to alter the distribution of air therethrough, so the sizes depicted are only illustrative.

Figure 9:
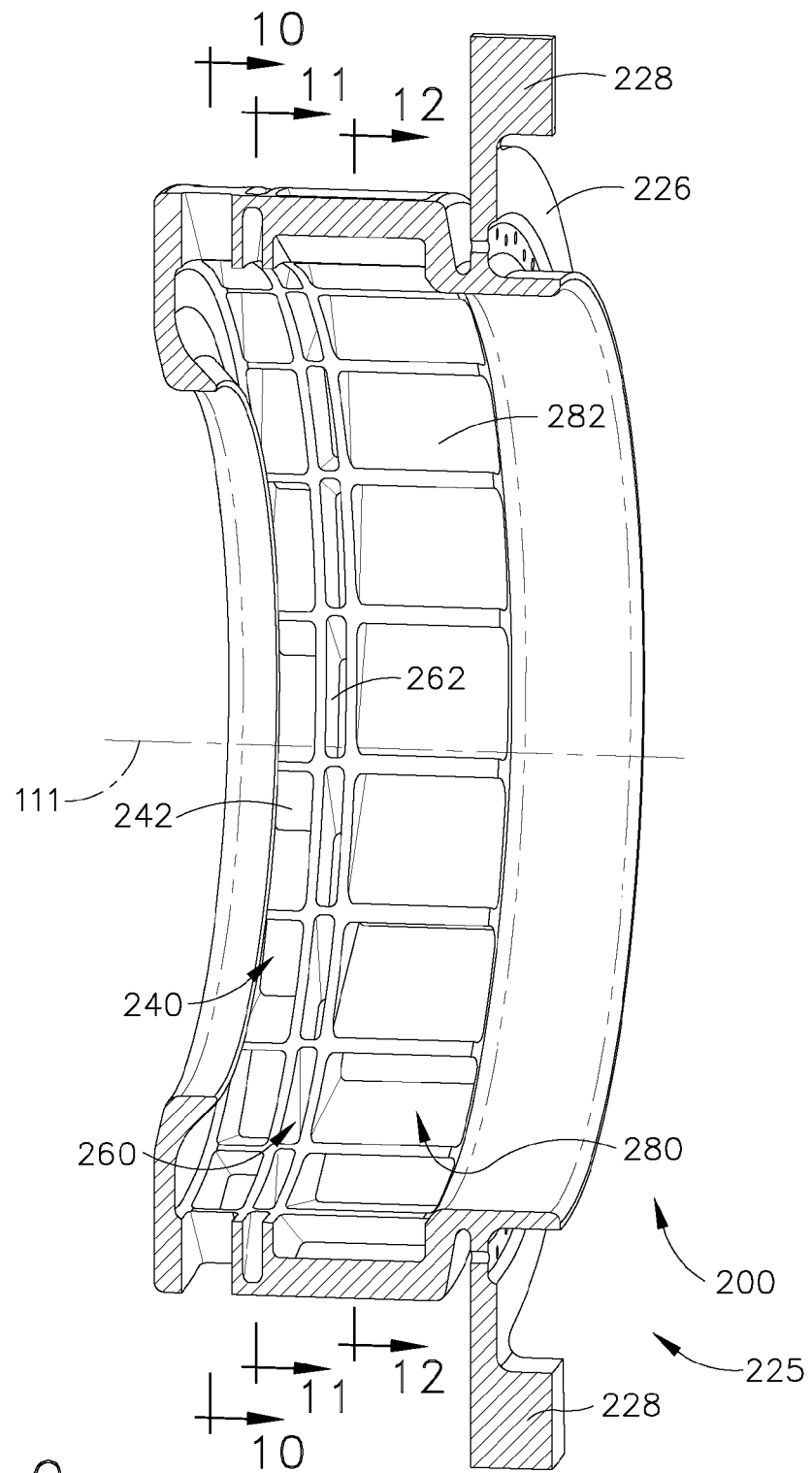
FIG. 9 is an isometric cross sectional view of the alternate exemplary embodiment of the present invention shown in FIG. 3.
Figure 10:
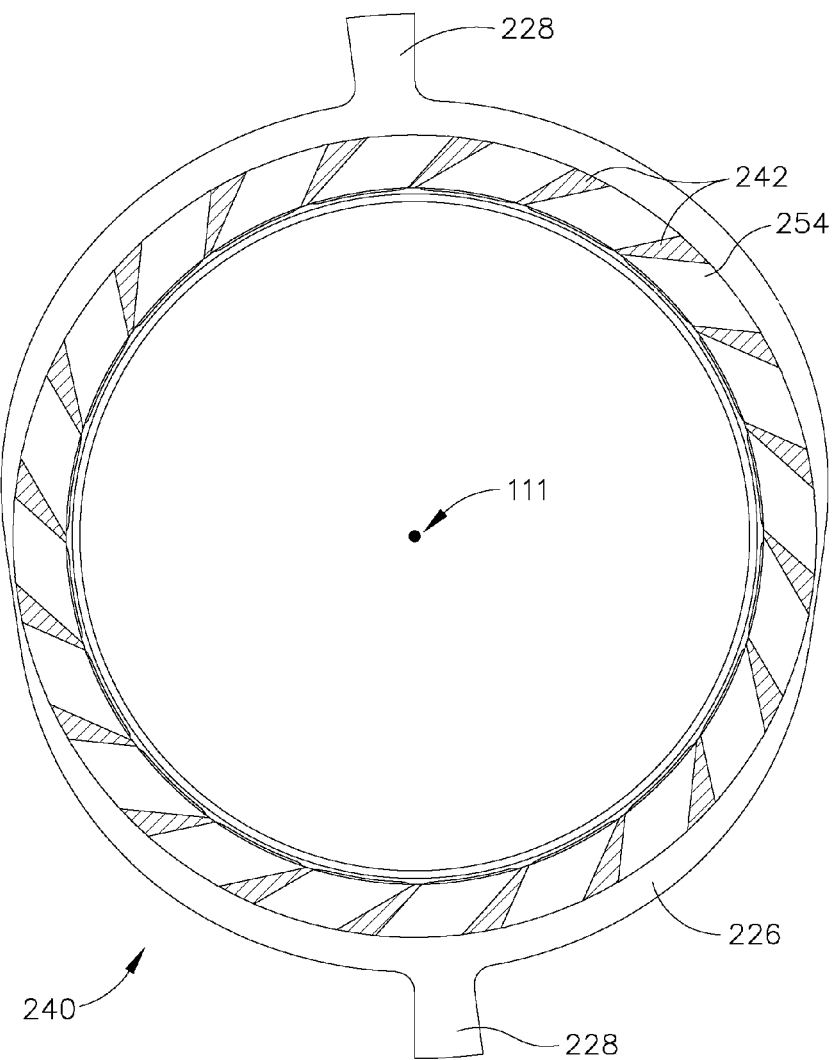
FIG. 10 is a frontal cross sectional view of the alternate exemplary embodiment of the present invention shown in FIG. 8.
Figure 11:
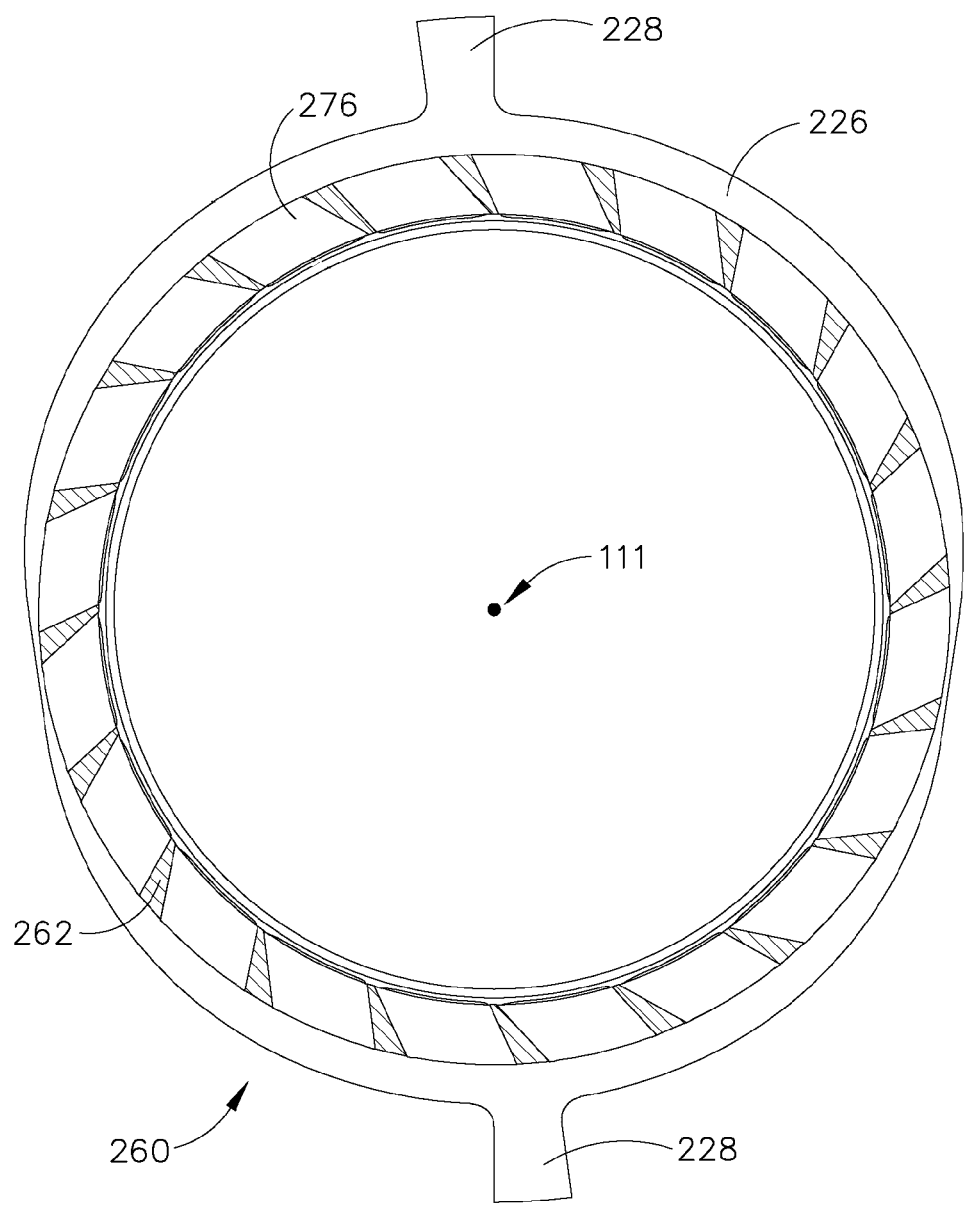
FIG. 11 is a frontal cross sectional view of the alternate exemplary embodiment of the present invention shown in FIG. 8.
Figure 12:
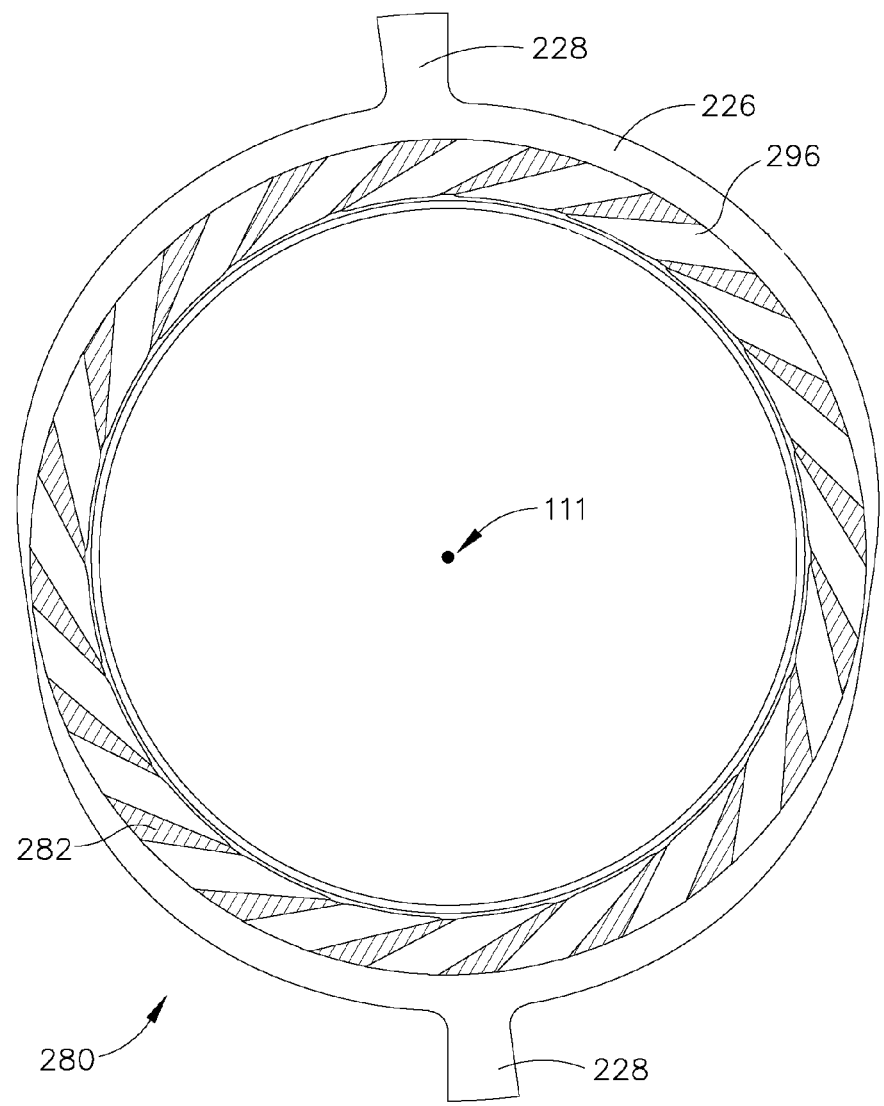
FIG. 12 is a frontal cross sectional view of the alternate exemplary embodiment of the present invention shown in FIG. 8.

An alternative exemplary embodiment of a unitary mixer 200 is shown in FIGS. 8-12. The unitary mixer 200 includes an annular main housing 220 (see FIG. 8) and a rim 224. It will be seen in FIGS. 8-12 that the exemplary unitary mixer 200 comprises a swirler arrangement 230 having first, second and third swirlers 240, 260 and 280, respectively. FIG. 9 shows an isometric cross sectional view of the unitary mixer 200. The first swirler 240 is a radial swirler, which is different from the axial swirler 140 shown in FIG. 3 and described previously herein A cross sectional view of the first swirler 240 taken perpendicular to the mixer axis 111 is shown in FIG. 10 The second swirler 260 is located axially aft from the first swirler 240, and is a radial swirler generally similar to the radial swirler 160 shown in FIG. 6 described previously herein. A cross sectional view of the second swirler 260 taken perpendicular to the mixer axis 111 is shown in FIG. 11. The third swirler 280 is located axially aft from the second swirler 260, and is a radial swirler generally similar to the radial swirler 180 shown in FIG. 7 described previously herein. A cross sectional view of the third swirler 280 taken perpendicular to the mixer axis 111 is shown in FIG. 12. It will be understood that, as shown in FIGS. 10, 11 and 12, air flowing through the first swirler 240, will be swirled in a first direction and air flowing through the second swirler 260 will preferably be swirled in a direction opposite the first direction, and the air flowing through the third swirler 280 will preferably be swirled in a direction opposite the second direction. This is accomplished by appropriately choosing the orientation angles for the air flow passages 254, 276 and 296 respectively. Air flows into the mixer 200 through flow passages 254, 276, and 296 in a generally radially inward direction having a substantial tangential orientation, as shown by air flow arrows 206, 204, and 202, respectively, Although radial vanes 242, 262 and 282 are shown in FIGS. 10, 11 and 12 as being substantially uniformly spaced circumferentially, thereby defining a plurality of substantially uniform passages therebetween, it will further be understood. that swirlers 240, 260 and 280 may include radial vanes 242, 262, 282 having different configurations so as to shape the air flow passages between circumferentially adjacent radial vanes in a desirable manner The unitary mixer 200 has a mount system 225 comprising an annular flange 226 and at least one pair of tabs 228 used to locate the unitary mixer 200 within the annular combustor 26 as described previously herein.

Figure 14:
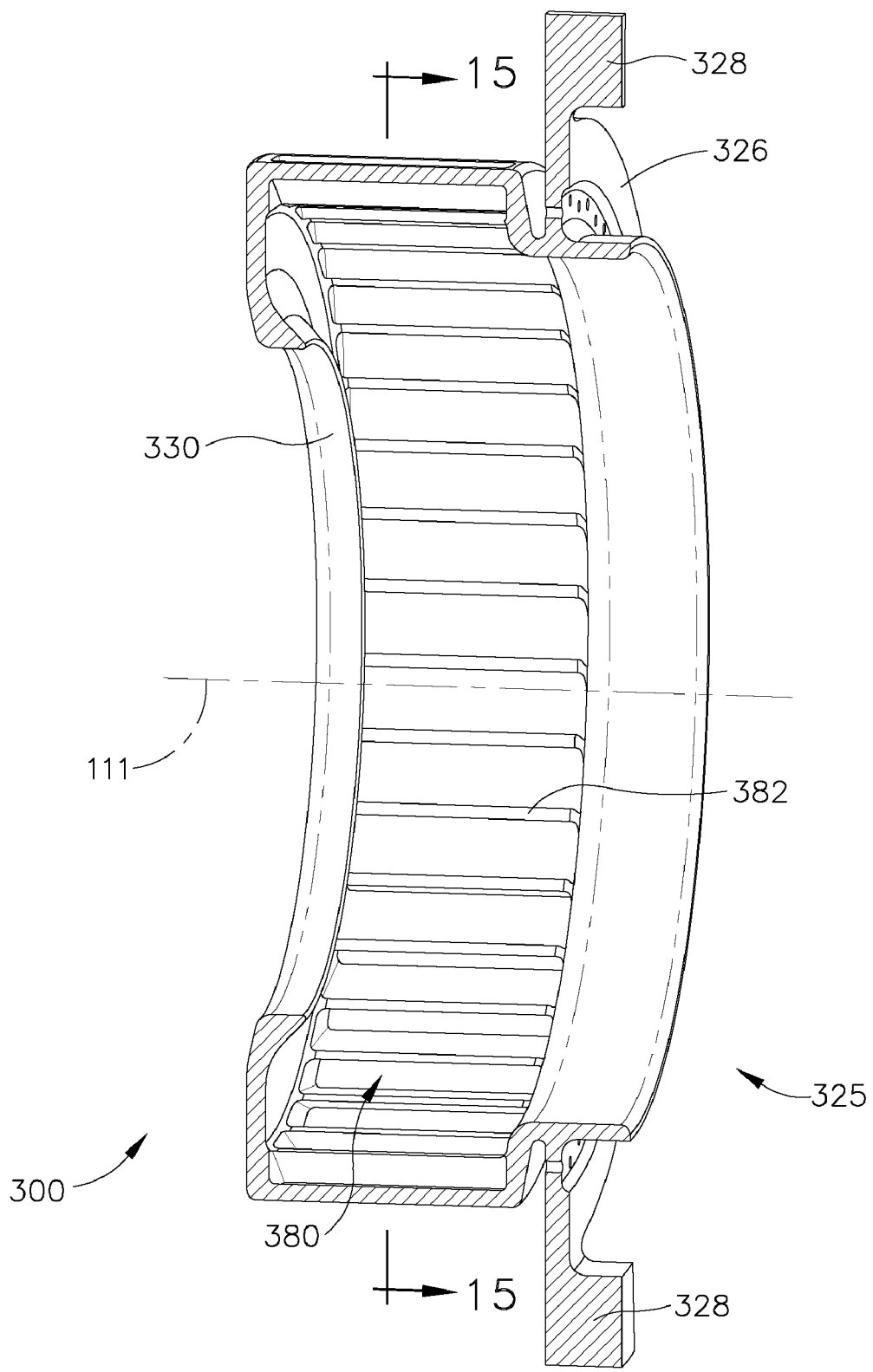
FIG. 14 is an isometric cross sectional view of the alternate exemplary embodiment of the present invention shown in FIG. 13.
Figure 15:
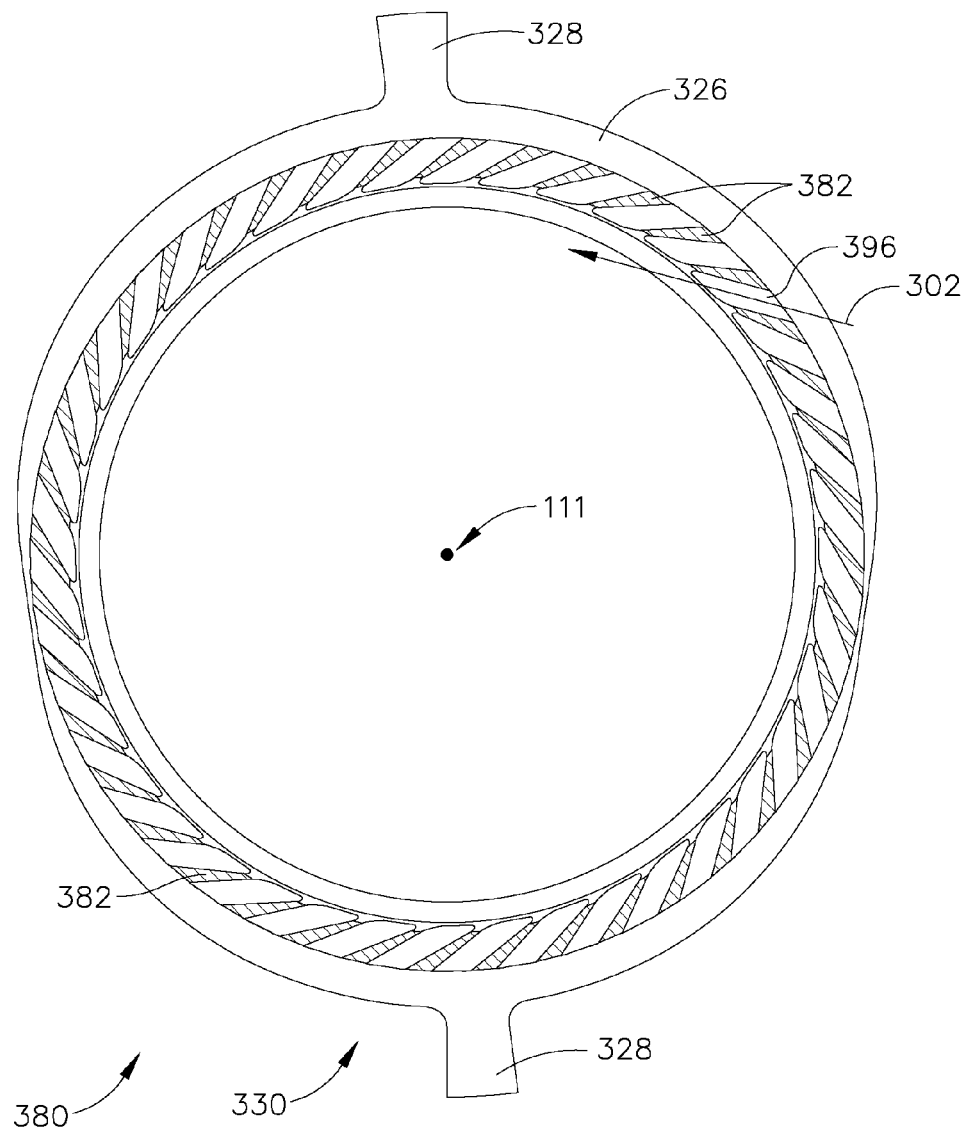
FIG. 15 is a frontal cross sectional view of the alternate exemplary embodiment of the present invention shown in FIG. 13.

Another alternative exemplary embodiment of a unitary mixer 300 is shown in FIGS. 13-15. The unitary mixer 300 includes an annular main housing 320 (see FIG. 13) and a rim 324. It will be seen in FIGS. 13-15 that the exemplary unitary mixer 300 comprises a swirler arrangement 330. A cross sectional view of the swirler arrangement 330 perpendicular to the mixer axis 111 is shown in FIG. 15. The swirler arrangement 330 includes a first swirler 380 which comprises radial vanes 382 arranged circumferentially around the mixer axis 111. Adjacent radial vanes 382 form a flow passage 396 between them. Air flows into the unitary mixer 300 through these passages in a generally radial-tangential direction, as represented by an arrow 302 in FIG. 15. The orientation angles for these radial vanes are similar to those for the radial vanes in the unitary mixers 100, 200 described previously herein. Although radial vanes 382 are shown in FIG. 15 as being substantially uniformly spaced circumferentially, thereby defining a plurality of substantially uniform passages 396 therebetween, it will further be understood that swirler arrangement 330 may include radial vanes 382 having different configurations so as to shape the air flow passages between circumferentially adjacent radial vanes in a desirable manner. The unitary mixer 300 has a mount system 325 comprising an annular flange 326 and at least one pair of tabs 328 used to locate the unitary mixer 300 within the annular combustor 26 as described previously herein.

Other embodiments for the swirler arrangements may be utilized in the unitary mixers 100, 200 and 300, as disclosed in patent applications entitled, "Mixer Assembly For Combustion Chamber Of A Gas Turbine Engine Having A Plurality Of Counter-Rotating Swirlers" having Ser. No. 11/188,596, "Swirler Arrangement For Mixer Assembly Of A Gas Turbine Engine Combustor Having Shaped Passages" having Ser. No. 11/188,595, and "Mixer Assembly For Combustor Of A Gas Turbine Engine Having A Main Mixer With Improved Fuel Penetration" having Ser. No. 11/188598.

Use of Rapid Manufacturing methods, such as, for example, Direct Metal Laser Sintering (DMLS), provides a manufacturing method that provides the capability of producing parts without custom molds and/or special tooling, like investment casting methods. Use of rapid manufacturing methods such as DMLS provides the capability to produce unitary mixers 100, 200, 300 having complex swirlers 130, 230, 330 and vane shapes that previously could not be produced using conventional machining or even EDM machining using multiple custom electrodes due to insufficient access on the inner diameter of the parts. The DMLS process uses powdered metal technology. The part being manufactured is modeled in a three-dimensional CAD model and geometrical data is broken into layers as small as 0.0004 inches. Conventional CAD software can be used for this purpose. Metal powder is deposited per the geometry definition defined for a specific layer. A laser is then used to sinter the powder to the layers underneath the current layer. Platforms and/or columns are used as a base for the first layer of powder and for support for large voids in the geometry. After completing the DMLS process, the platforms and/or support columns can be machined off using conventional machining methods. Use of rapid manufacturing processes, such as the DMLS process, provides the capability of producing complex unitary mixers, such as items 100, 200, 300 shown herein, having complex three-dimensional swirlers with swept aerodynamic vane shapes, with reduced part-to-part variability.

The exemplary embodiment of a unitary mixer 100 shown in FIG. 3 and the alternative embodiments of the unitary mixer 200, 300 shown in FIGS. 8 and 13 can be made using rapid manufacturing processes such as Direct Metal Laser Sintering (DMLS), Laser Net Shape Manufacturing (LNSM), electron beam sintering and other known processes in rapid manufacturing. DMLS is a preferred method of rapid manufacturing unitary mixers such as the items 100, 200, 300 described herein.

Figure 16:
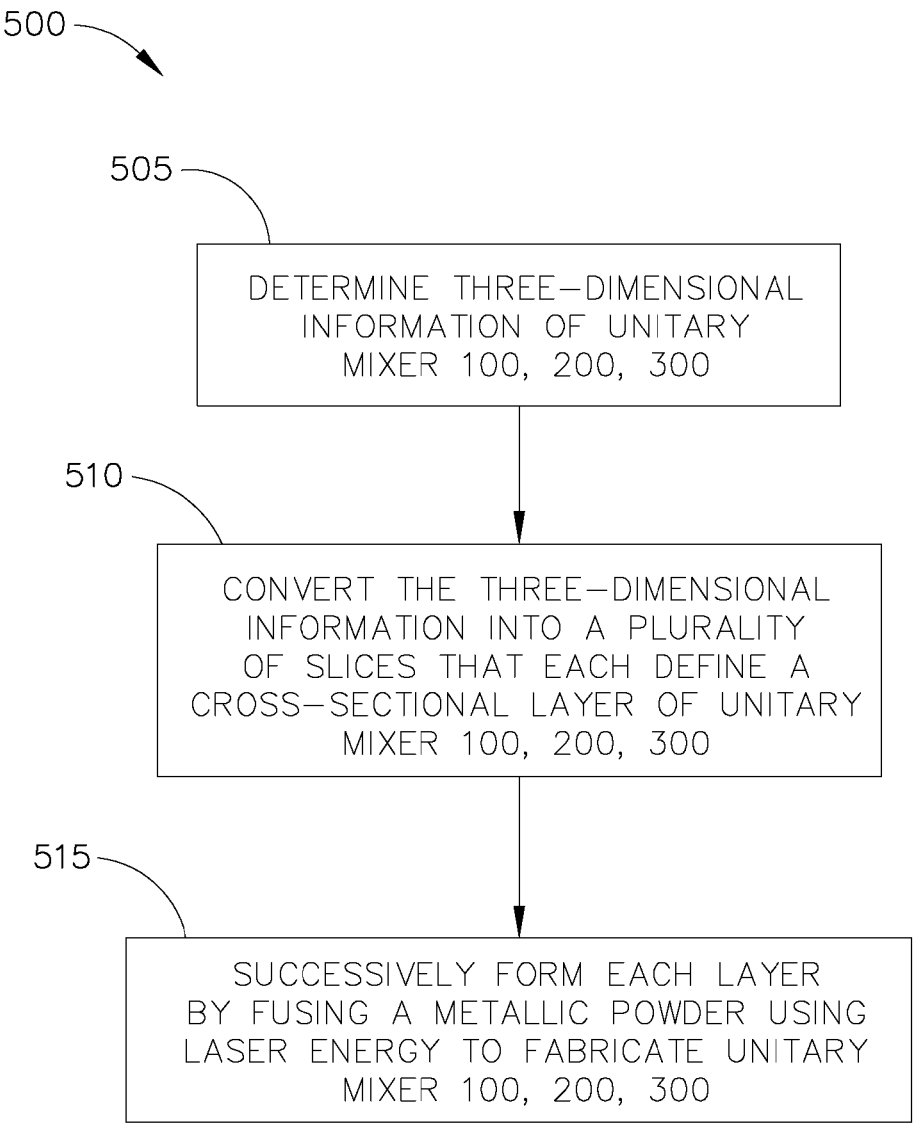
FIG. 16 is a flow chart showing an exemplary embodiment of a method for fabricating a mixer having a unitary construction.

FIG. 16 is a flow chart illustrating an exemplary embodiment of a rapid manufacturing method 500 for fabricating unitary mixers such as items 100, 200, 300 shown in FIGS. 3, 8 and 13, and described herein. Method 500 includes fabricating unitary mixer 100, 200, 300 using Direct Metal Laser Sintering (DMLS). DMLS is a known manufacturing process that fabricates metal components using three-dimensional information, for example a three-dimensional computer model, of the component. The three-dimensional information for the unitary mixer 100, 200, 300 is converted into a plurality of slices, each slice defining a cross section of the unitary mixer for a predetermined height of the slice. The unitary mixer is then "built-up" slice by slice, or layer by layer, until finished. Each layer of the unitary mixer is formed by fusing a metallic powder using a laser.

Accordingly, method 500 includes the step 505 of determining three-dimensional geometric and other information of the unitary mixer 100,200,300 (shown in FIG. 3, FIG. 8 and FIG. 13) and the step 510 of converting the three-dimensional information into a plurality of slices that each define a cross-sectional layer of the unitary mixer 100,200, 300. The unitary mixer 100,200,300 is then fabricated using DMLS, or more specifically, each layer of the unitary mixer 100, 200, 300 is successively formed (step 515) by fusing a metallic powder using laser energy. Each layer has a size between about 0.0005 inches and about 0.001 inches. Unitary mixer 100, 200, 300 may be fabricated using any suitable laser sintering machine. Examples of suitable laser sintering machines include, but are not limited to, an EOSINT.RTM. M 270 DMLS machine, a PHENIX PM250 machine, and/or an EOSINT.RTM. M 250 Xtended DMLS machine, available from EOS of North America, Inc. of Novi, Mich. The metallic powder used to fabricate the unitary mixer 100, 200, 300 is preferably a powder including cobalt chromium, but may be any other suitable metallic powder, such as, but not limited to, HS 188 and INC0625. The metallic powder can have a particle size of between about 10 microns and 74 microns, preferably between about 15 microns and about 30 microns. In the exemplary embodiments of the unitary mixer 100, 200, 300 disclosed herein, a EOSINT 270 laser sintering system using a 200 W Ytterbium Fiber laser in an Argon atmosphere was used.

Although the methods of manufacturing unitary mixers 100, 200, 300 have been described herein using DMLS as the preferred method, those skilled in the art of manufacturing will recognize that any other suitable rapid manufacturing methods using layer-by-layer construction or additive fabrication can also be used. These alternative rapid manufacturing methods include, but not limited to, Selective Laser Sintering (SLS), Selective Laser Melting (SLM), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Solid Free Form Fabrication (SFF) and Layer Manufacturing.

When introducing elements/components/etc. of the methods and/or unitary mixers described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A unitary mixer comprising:
   an annular housing having an axis; and
   at least a first swirler having a plurality of vanes arranged circumferentially around the axis such that circumferentially adjacent vanes form at least one flow passage that is oriented at least partially in an axial direction with respect to the axis, wherein at least one of the flow passages is converging in a flow direction, and wherein at least one of the flow passages is diverging or has a substantially constant width in a flow direction, and wherein at least one of the flow passages that is converging is circumferentially adjacent to at least one of the flow passages that is diverging, wherein the individual vanes forming the flow passages have different vane thickness variations from each other in the axial direction; and
   a mount system for mounting the unitary mixer in a gas turbine engine combustor.

2. A unitary mixer according to claim 1 wherein at least one flow passage is oriented at least partially in a tangential direction.

3. A unitary mixer according to claim 1 wherein the mount system comprises at least one mounting tab.

4. A unitary mixer according to claim 1 wherein the mount system comprises a flange.

5. A unitary mixer according to claim 1 further comprising a second swirler located axially aft from the first swirler.

6. A unitary mixer according to claim 5 wherein the second swirler comprises a plurality of radial vanes arranged circumferentially around the axis.

7. A unitary mixer according to claim 1 further comprising a second swirler located axially aft from the first swirler and a third swirler located axially aft from the second swirler.

8. A unitary mixer according to claim 7 wherein the second swirler comprises a plurality of radial vanes and the third swirler comprises a plurality of radial vanes arranged circumferentially around the axis.

* * * * *